(12) United States Patent
College et al.

(10) Patent No.: US 11,592,121 B2
(45) Date of Patent: Feb. 28, 2023

(54) METHOD AND DEVICE FOR POSITIONING COMPONENTS ON A CABLE

(71) Applicant: TE Connectivity Services GmbH, Schaffhausen (CH)

(72) Inventors: David Alan College, Annville, PA (US); Mark Ondo, Harrisburg, PA (US)

(73) Assignee: TE Connectivity Solutions GmbH

( * ) Notice: Subject to any disclaimer, the term of this patent is extended or adjusted under 35 U.S.C. 154(b) by 253 days.

(21) Appl. No.: 16/850,061

(22) Filed: Apr. 16, 2020

(65) Prior Publication Data

US 2021/0324970 A1  Oct. 21, 2021

(51) Int. Cl.
| | | |
|---|---|---|
| *B23P 19/04* | (2006.01) | |
| *F16L 3/00* | (2006.01) | |
| *F16L 3/10* | (2006.01) | |
| *H01B 13/22* | (2006.01) | |
| *B23P 11/00* | (2006.01) | |

(52) U.S. Cl.
CPC ............. *F16L 3/003* (2013.01); *B23P 11/005* (2013.01); *B23P 19/04* (2013.01); *F16L 3/1066* (2013.01); *H01B 13/22* (2013.01)

(58) Field of Classification Search
CPC .................................. B23P 11/005; B23P 19/04
See application file for complete search history.

(56) References Cited

U.S. PATENT DOCUMENTS

| | | | |
|---|---|---|---|
| 2,038,840 A | 4/1936 | Hall | |
| 3,871,057 A | 3/1975 | Moulin | |
| 4,653,182 A | 3/1987 | Fukuda et al. | |
| 6,049,960 A * | 4/2000 | Pilling | B25B 27/28 29/450 |
| 7,810,230 B2 | 10/2010 | Ikeda et al. | |
| 2014/0208591 A1* | 7/2014 | Seraj | H02G 15/1826 29/745 |

FOREIGN PATENT DOCUMENTS

| | | |
|---|---|---|
| DE | 19807840 A1 | 8/1999 |
| WO | 8900782 A1 | 8/1989 |

OTHER PUBLICATIONS

International Search Report, International Application No. PCT/IB2021/053156 International Filing Date Apr. 16, 2021.

* cited by examiner

*Primary Examiner* — Nirvana Deonauth (57) ABSTRACT

A device and method of positioning a component on a cable. The method includes: moving a collet into position on the component; engaging the component with the collet; moving the collet with the component positioned thereon into alignment with an end of the cable; securing the collet to the end of the cable; moving the component from the collet to the cable; and removing the collet from the end of the cable.

8 Claims, 9 Drawing Sheets

METHOD AND DEVICE FOR POSITIONING COMPONENTS ON A CABLE

FIELD OF THE INVENTION

The present invention is directed to a method and a device for positioning one or more components on a cable. In particular, the invention is directed to a method and device which facilitates the insertion of components over an end of the cable.

BACKGROUND OF THE INVENTION

The insertion of components, such as shielding ferrules and seals is often accomplished by hand. Accordingly, the insertion operation involves extremely low productivity. In addition, as the ends of cables often become misshaped, it is often difficult to insert components on the ends of the cables without a good deal of manipulation of the components and the cable to allow the cable to be moved past the misshaped ends.

It would therefore be beneficial to provide a device and method which increase the productivity of assembly. In addition, there is a need to provide a device and method which reshapes the end of the cable to allow for ease of insertion of the component onto the cable.

SUMMARY OF THE INVENTION

An embodiment is directed to a method of positioning a component on a cable. The method includes: moving a collet into position on the component; engaging the component with the collet; moving the collet with the component positioned thereon into alignment with an end of the cable; securing the collet to the end of the cable; moving the component from the collet to the cable; and removing the collet from the end of the cable.

An embodiment is directed to a method of positioning a component on a cable. In the method the collet is engaged with the component, the collet being maintained in a first or closed position in which an outside diameter of a free end of the collet is less than an inside diameter of an opening of the component. The collet is moved to a second or expanded position in which the outside diameter of the free end of the collet is greater than the inside diameter of the opening of the component, wherein the component is secured to or captured by the collet. The collet is moved while in the expanded position with the component positioned thereon into alignment with an end of the cable with the cable positioned in a cable receiving opening of the collet, wherein an inside diameter of the cable receiving opening of the free end of the collet is greater than an outside diameter of the cable. The collet is secured to the end of the cable by moving the collet toward the closed position, wherein the free end of the collet is moved into engagement and compresses the end of the cable to secure the collet to the cable and causing the end of the cable to conform to a circular shape of the conductor receiving opening of the collet. The component is then moved from the collet to the cable. With the component removed from the collet, the collet is moved to the expanded position and the collet is removed from the end of the cable.

An embodiment is directed to a collet mechanism for inserting components on a cable. The collet mechanism has an expandable portion with an opening which extends along a longitudinal axis of the collet mechanism. Resilient legs are provided on the expandable portion. The resilient legs have fixed ends and free ends. Slots are provided between the resilient legs. The slots separate the resilient legs to allow each resilient leg to act independently of the other resilient legs. The expandable portion is movable between a closed position, in which the resilient legs have a first outside diameter, and an expanded position, in which the resilient legs have a second outside diameter, the second diameter being greater than the first diameter.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 1:
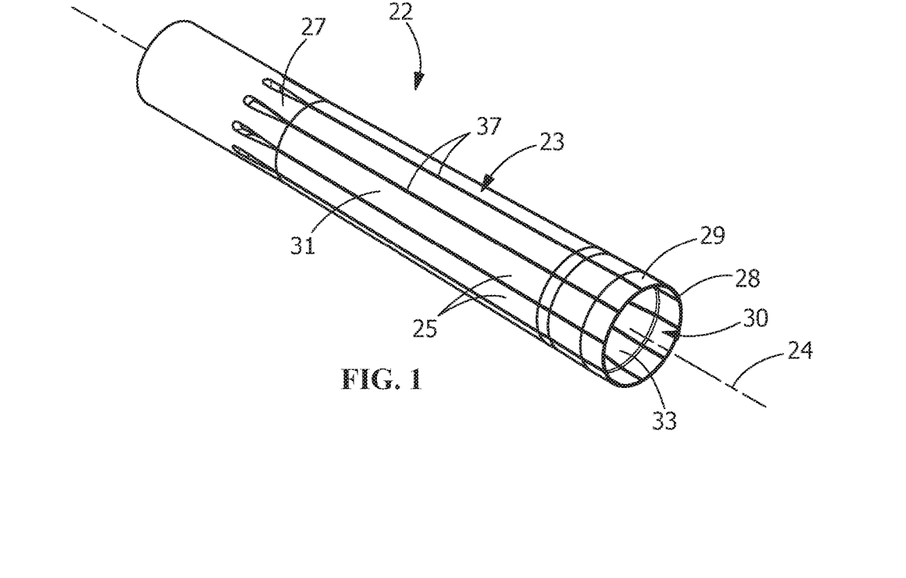
FIG. 1 is a perspective view of an illustrative collet according to the present invention.
Figure 2:
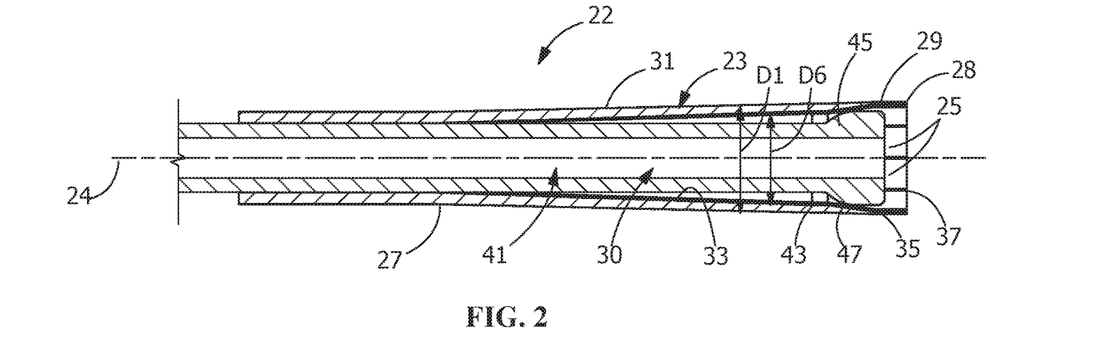
FIG. 2 is a cross-sectional view of the collet of FIG. 1 shown in a first or closed position in which resilient collet arms are shown in an unstressed position.
Figure 3:
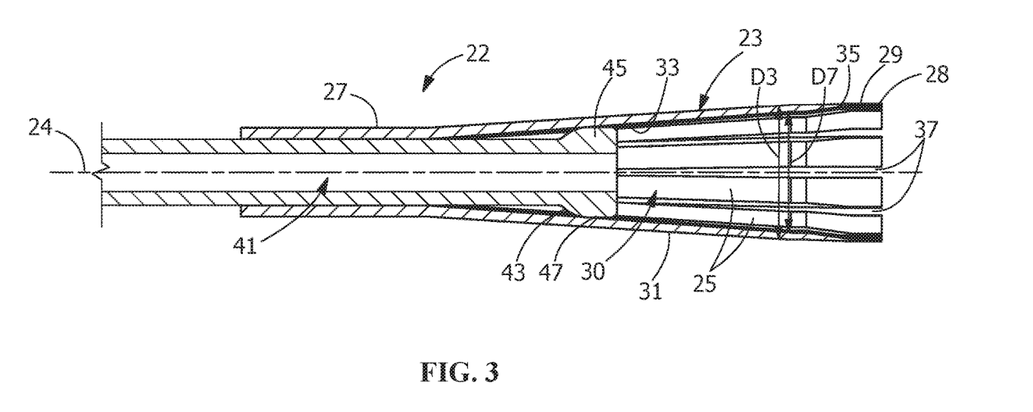
FIG. 3 is a cross-sectional view of the collet of FIG. 1 shown in a second or expanded position in which resilient collet arms are shown in an expanded or stressed position.

As shown in FIGS. 1 through 3, a collet mechanism 22 for use in positioning components 18 (FIGS. 4 through 10) on a cable 10 is shown. The collet mechanism 22 has an expandable portion 23 with a free end 28. The expandable portion 23 has an opening 30 which extends along a longitudinal axis 24 of the collet mechanism 22. The expandable portion 23 is movable between a first or closed position (as shown in FIG. 2) and a second or expanded position (as shown in FIG. 3). Resilient legs 25 are provided on the expandable portion 23. The resilient legs 25 have fixed ends 27 and free ends 29. The free ends 29 are position at the free end 28 of the collet mechanism 22. The resilient legs 25 have outer surfaces 31 which defines the outer surface of the expandable portion 23 and inner surfaces 33 which define the opening 30. The inner surfaces 33 have camming surfaces 35 provide thereon. The camming surfaces 35 are provided between the fixed ends 27 and the free ends 29. Slots or gaps 37 are provided between the resilient legs 25. The slots or gaps 37 extend from the free ends 29 to proximate the fixed ends 27. The slots 37 separate or space the resilient legs 25 to allow each resilient leg 25 to act independently of the other resilient legs 25.

A camming tool 41 is provided in the opening 30 of the collet mechanism 22. The camming tool 41 has an enlarged portion 43 which has camming surfaces 45 provided thereon. The camming surfaces 45 of the enlarged portion 43 are positioned between the camming surfaces 35 of the resilient legs 25 and the free ends 29 of the resilient legs 25 when the expandable portion 23 is in the first position, as shown in FIG. 2. In the first position, the expandable portion 23 has an outside diameter of D1 and an inside diameter D6 of the opening 30.

As the camming tool 41 is moved from the first position to the second position, the camming surfaces 43 of the enlarged portion 45 are initially positioned in engagement with the camming surfaces 35 of the resilient legs 25, causing the free ends 29 of the resilient legs 25 to move outward or expand away from the longitudinal axis 24 of the collet mechanism 22. Continued movement of the camming tool 41 toward the second position causes outside surfaces 47 of the enlarged portion 45 of the camming tool 41 to engage the inner surfaces 33 of the expandable portion 23, causing the free ends 29 of the resilient legs 25 to move further outward or further expand away from the longitudinal axis 24 of the collet mechanism 22 to the second position, as shown in FIG. 3. In the second position, the expandable portion 23 has an outside diameter of D3 and an inside diameter D7 of the opening 30.

Figure 4:
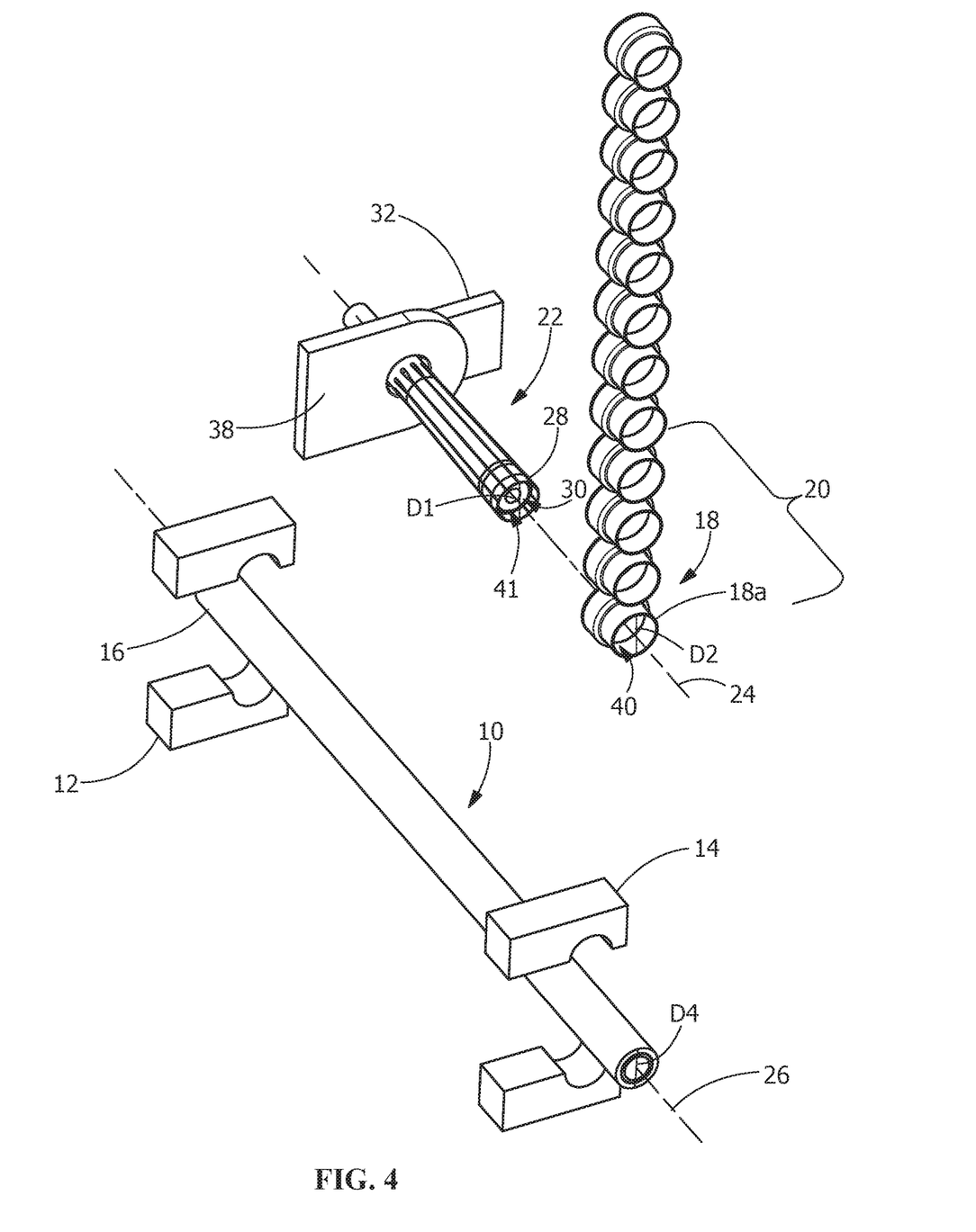
FIG. 4 is a diagrammatic view of a cable and representative components with the collet shown prior to engaging a respective component.

As shown diagrammatically in FIG. 4, a wire or cable 10 is positioned between one or more clamps 12, 14. As shown in FIG. 4, the first or front clamp 12 is positioned proximate a free end 16 of the cable 10. The second or rear clamp 14 is spaced from the first clamp 12. Positioned proximate to the cable 10 is one or more components 18. The components 18 may be, but are not limited to, seals, shielding ferrules and/or housing parts. The components 18 shown in FIG. 4 are depicted to be in a loading magazine (not shown). However, the components 18 may be presented in other devices or by other methods. A loading zone 20 of the components 18 is shown to be in horizontal alignment with the positioning of the cable 10. However, the loading zone 20 may be positioned in other locations, including but not limited to, in vertical alignment with the positioning of the cable 10. The collet mechanism 22 is provided in alignment with a respective component 18a which is positioned in the loading zone 20. In the initial or loading position shown in FIG. 4, the longitudinal axis 24 of the collet mechanism 22 extends in a direction which is essentially parallel to the longitudinal axis 26 of the cable 10. However, other orientations of the collet mechanism 22 may be used.

Figure 5:
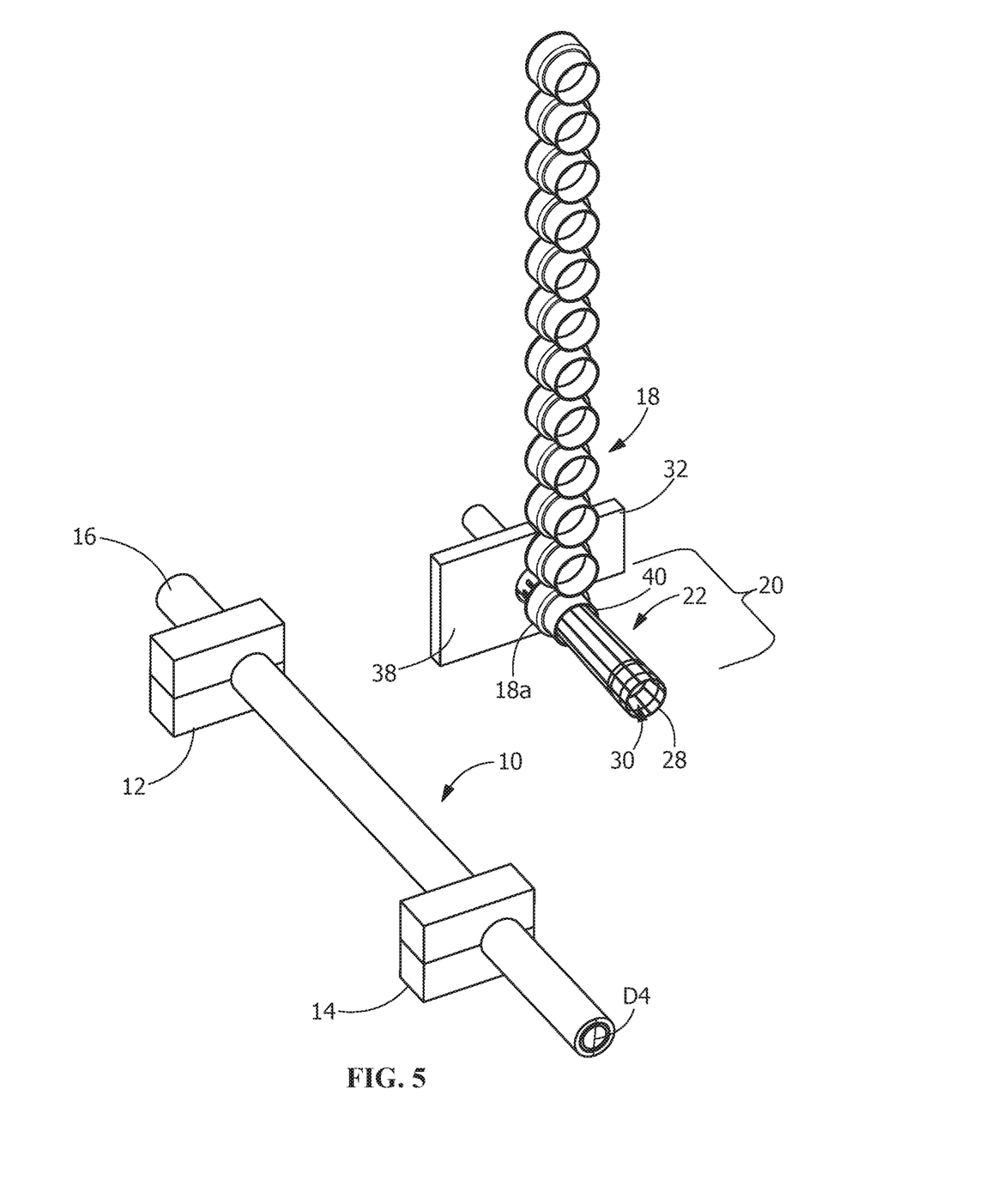
FIG. 5 is a diagrammatic view similar to FIG. 4 with the collet shown in engagement with the respective component.

With the cable 10 properly positioned between the clamps 12, 14, the clamps 12, 14 are closed around the cable 10 to retain the cable in position, as shown in FIG. 5. In addition, a front free end 28 of the collet mechanism 22 is moved into an opening 40 of the respective component 18a which is positioned in the loading zone 20. The clamps 12, 14 and the collet mechanism 22 may be driven by various types of drive devices, including, but not limited to, air cylinders which are controlled by a programmed controller. During this movement, the collet mechanism 22 is retained in a first position, in which an outside diameter D1 of the free end 28 of the collet mechanism 22 is less than an inside diameter D2 of the opening 40 of the component 18a. This allows the front end 28 of the collet mechanism 22 to move through the opening 40 of the component 18a with little or no restriction.

Figure 6:
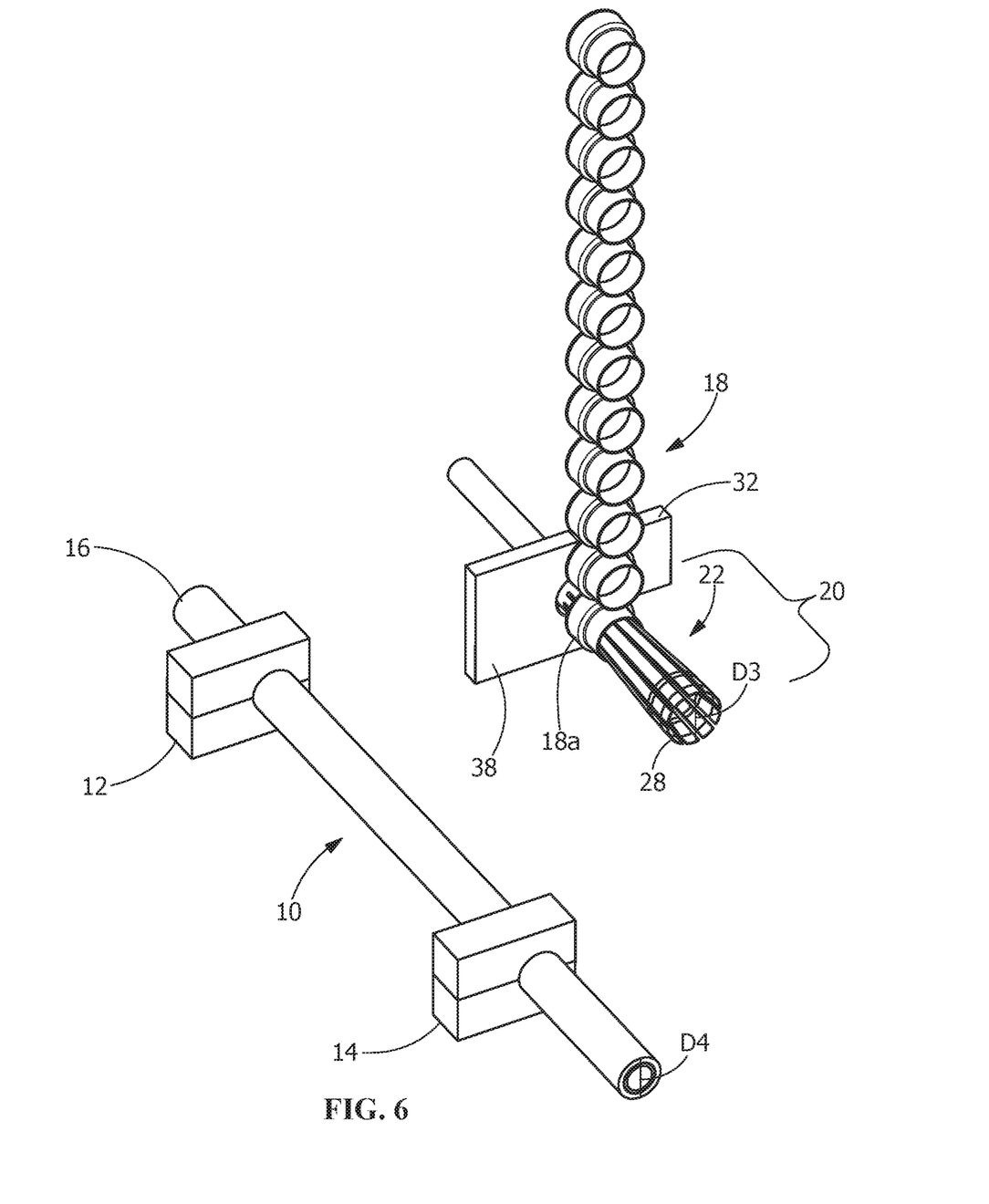
FIG. 6 is a diagrammatic view similar to FIG. 5 with the collet shown in engagement with the respective component and expanded.

As shown in FIG. 6, with the collet mechanism 22 properly positioned in the opening 40 of the component 18a, the free end 28 of the collet mechanism 22 is resiliently deformed, expanded or flared open to a second position, as previously described, in which the outside diameter D3 of the free end 28 of the collet mechanism 22 is greater than the inside diameter D2 of the opening 40 of the component 18a. With the collet mechanism 22 in the second position, the component 18a is prevented from being moved over the free end 28 of the collet mechanism 22 and is retained on the collet mechanism 22.

Figure 7:
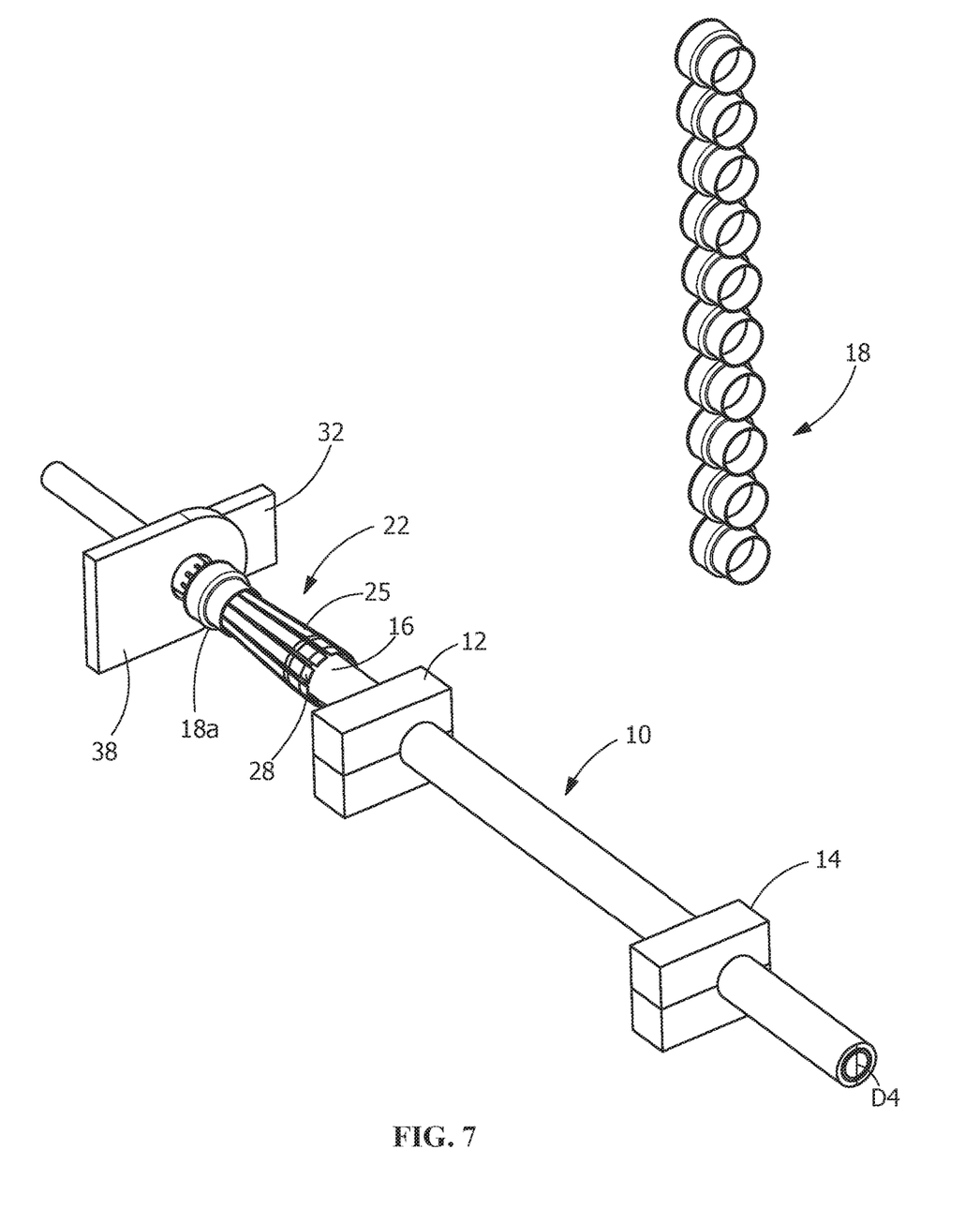
FIG. 7 is a diagrammatic view similar to FIG. 6 with the collet shown positioned proximate an end of the cable.

With the component 18a properly retained on the collet mechanism 22, the collet mechanism 22 and component 18a are moved from the loading zone 20 and are moved into alignment with the free end 16 of the cable 10, as shown in FIG. 7. As shown in FIGS. 6 and 7, the collet mechanism 22 is moved horizontally. However, the collet mechanism 22 may be moved in other directions, such as, but not limited to, vertically, depending or the relative positions of the cable 10 and components 18.

The collet mechanism 22 is maintained in the second position as the collet mechanism 22 is moved into alignment with the cable 10. In the second position, an inside diameter D7 (FIG. 3) of the free end 28 of the collet mechanism 22 is greater than an outside diameter D4 of the cable 10. This allows the free end 28 of the collet mechanism 22 to be moved over the free end 16 of the cable 10.

With the free end 28 of the collet mechanism 22 properly positioned over the free end 16 of the cable 10, the free end 28 of the collet mechanism 22 is returned toward the first position. As this occurs, the camming tool 41 is moved from the second position shown in FIG. 3 to the first position shown in FIG. 2. This allows the enlarged portion 45 of the camming tool 41 to again be positioned between the camming surfaces 35 of the resilient legs 25 and the free ends 29 of the resilient legs 25, such that the camming surfaces 43 of the enlarged portion 45 do not engage the inner surfaces 33 of the resilient legs 25 of the expandable portion 23.

Figure 8:
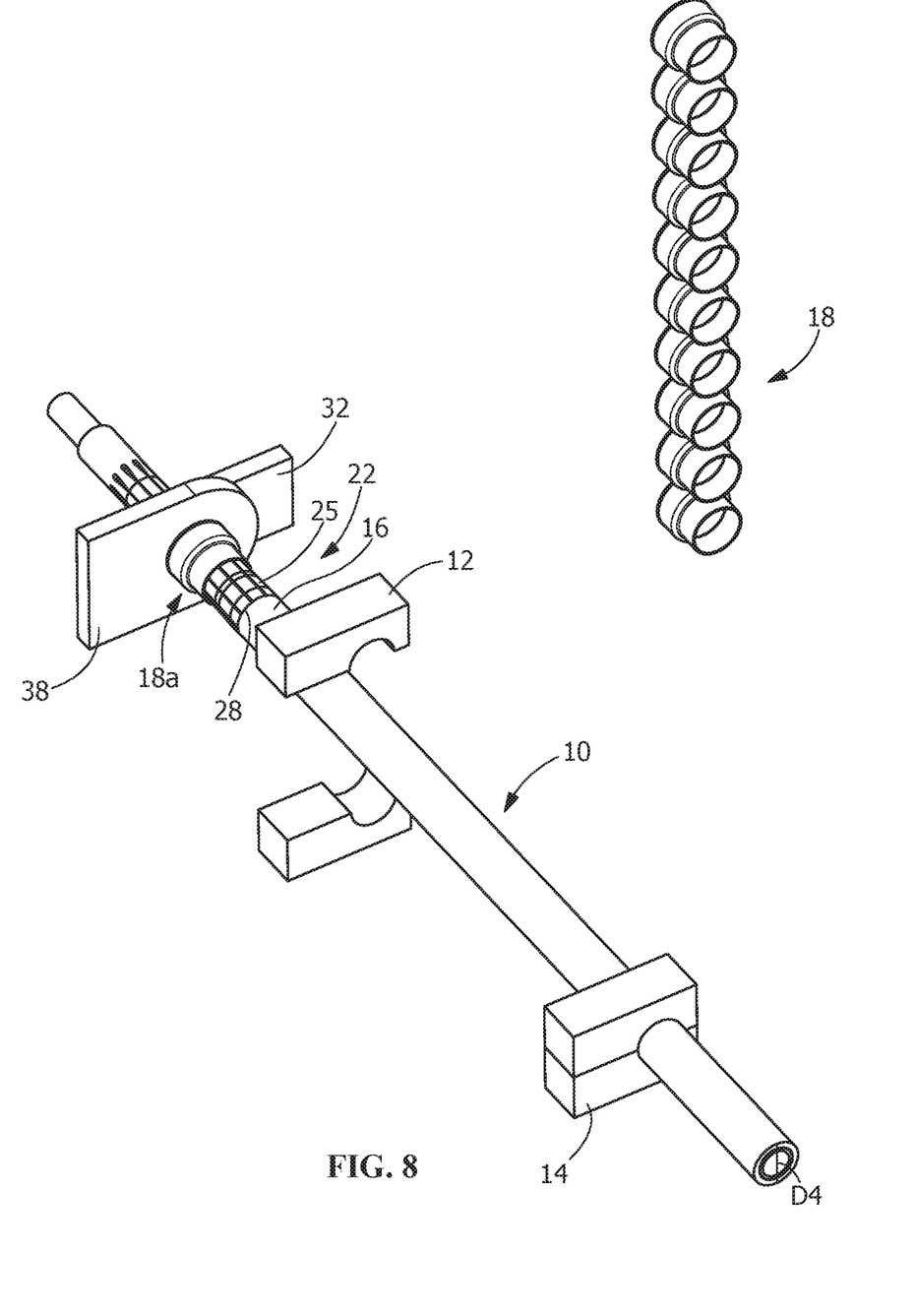
FIG. 8 is a diagrammatic view similar to FIG. 7 with the collet shown in engagement with the end of the cable.
Figure 9:
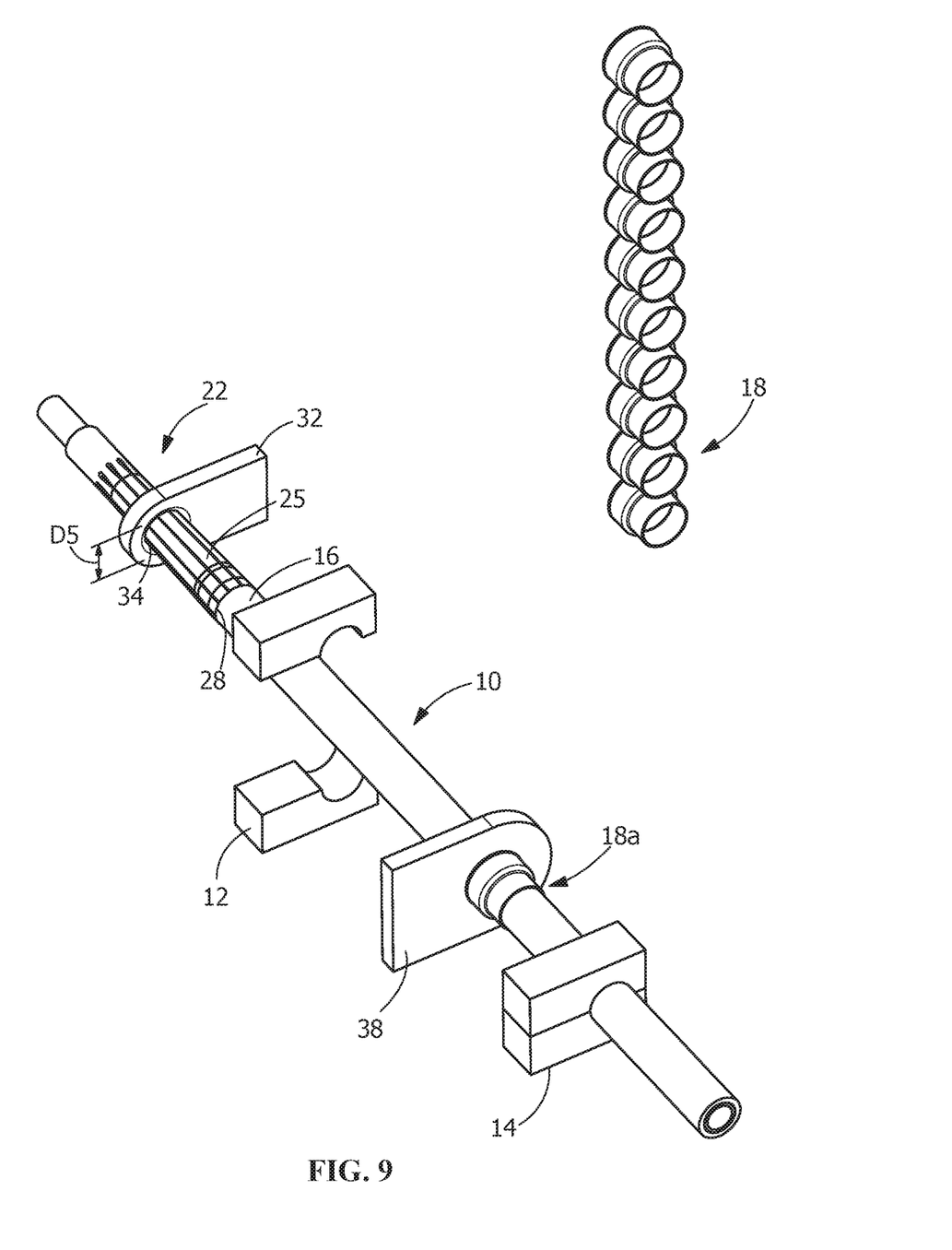
FIG. 9 is a diagrammatic view similar to FIG. 8 with the respective component moved into engagement with the cable.

In addition, as shown in FIGS. 7 and 8, a collet closer device 32 which is positioned on the collet mechanism 22 is moved toward the free end 28 of the collet mechanism 22 to move the free end 28 of the collet mechanism 22 from the second position (FIGS. 3 and 7) to the first position (FIGS. 2 and 8). As this occurs, a component positioning device 38, which is provided proximate the collet closer device 32 is also moved toward the end 16 of the cable 10. As shown in FIG. 9, the collet closer device 32 has an opening 34 with a diameter D5 which is approximately equal to the outside diameter D1 of the free end 28 of the collet mechanism 22 when the collet mechanism 22 is in the first position. Therefore, as the collet closer device 32 is moved toward the free end 28 of the collet mechanism 22, the opening 34 of the collet closer device 32 engages the free end 28 of the collet mechanism 22, moving or closing the free end 28 of the collet mechanism 22 back toward the first position.

In the position shown in FIG. 8, the free end 28 of the collet mechanism 22 is position in engagement with the end 16 of the cable 10 to secure the collet mechanism 22 to the cable 10. The clamping force exerted by the resilient arms 25 of the collet mechanism 22 is sufficient to retain the collet mechanism 22 in position. The clamping force is also sufficient to form the free end 16 of the cable 10, whereby if the free end 16 of the cable 10 is not round or the circumference of the free end 16 of the cable 10 has been deformed, the free end 28 of the collet mechanism 22 interacts with the free end 16 of the cable 10 such that the free end 16 of the cable 10 will conform to the shape of the inner surfaces 33 of the resilient legs 25 at the free end 28 of the collet mechanism 22.

In the position shown in FIG. 8, the free end 28 of the collet mechanism 22 frictionally engages or grips the free end 16 of the cable 10 to secure the collet mechanism 22 to the cable 10. As the free end 28 of the collet mechanism 22 grips or compresses the free end 16 of the cable 10, a smooth transition is provided between the free end 28 of the collet mechanism 22 and the cable 10.

With the collet mechanism 22 securely positioned on the cable 10, the first clamp 12 is opened, as shown in FIG. 8. With the first clamp 12 open and the collet mechanism 22 securely positioned on the cable 10, the component positioning device 38 is moved toward the free end 28 of the collet mechanism 22 and the cable 10. As shown in FIGS. 8 and 9, the movement of the component positioning device 38 causes the component positioning device 38 to engage and move the component 18a from the collet mechanism 22 to a programmed position on the cable 10. As a smooth transition with no shoulder or obstruction is provided between the collet mechanism 22 and the cable 10, the component 18a may be freely moved from the collet mechanism 22 to the cable 10 is facilitate by the smooth transition 36 between the collet mechanism 22 and the cable 10.

Figure 10:
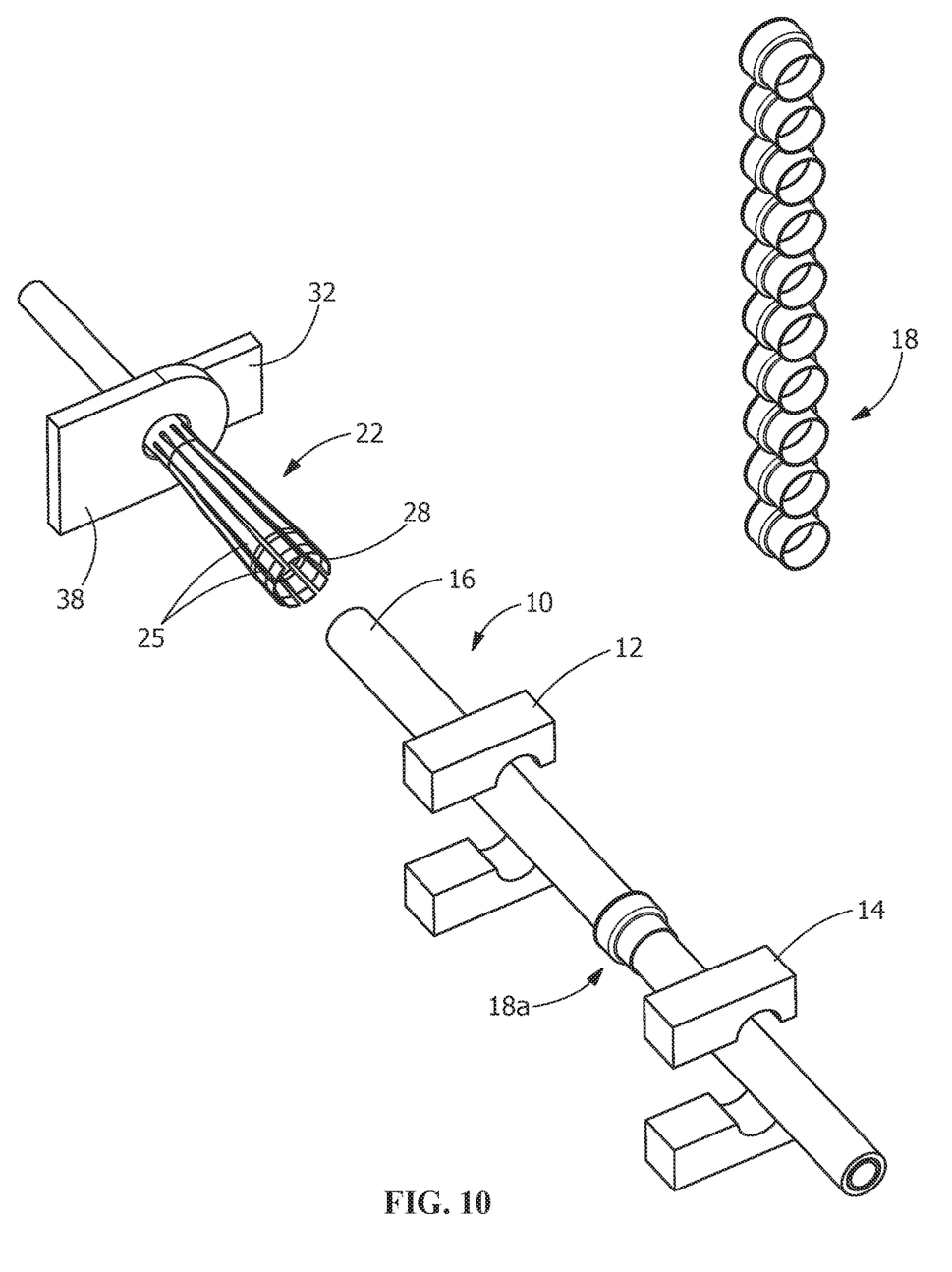
FIG. 10 is a diagrammatic view similar to FIG. 9 with the collet expanded and removed from the end of the cable.

With the component 18a properly positioned, the component positioning device 38 and the collet closer device 32 are retracted to their original position, as shown in FIG. 10. With the component positioning device 38 and the collet closer device 32 properly retracted, the free end 28 of the collet mechanism 22 is again moved to the second position, in the manner previously described. With the free end 28 of the collet mechanism 22 moved to the second position, the free end 28 of the collet mechanism 22 is retracted or removed from the free end 16 of the cable 10 and the second clamp 14 is opened, thereby allowing the removal of the assembled cable 10.

If components are to be inserted on additional cables, the collet mechanism 22 is returned to the position shown in FIG. 4 and an additional cable 10 is moved into position. The process or method described above is then repeated as needed.

The process or method may be performed manually or semi-automatically with an operator controlling the steps, or may be performed fully automatically be a machine with a controller programmed to perform the steps.

While the above process or method is described using one component 18, the process or method may be used to apply multiple components simultaneously. Alternatively, multiple components may be applied in series to a cable 10, allowing each component 18 to be moved independently to its programmed position. This may be done using one collet mechanism 22 which obtains components 18 from multiple magazines, or by using multiple collets, each obtaining components 18 from individual magazines.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of positioning a component on a cable, the method comprising:
   moving a collet into position within the component, the collet being in a closed position in which arms of the collet are not expanded;
   engaging the component with the collet;
   moving a camming tool, provided inside an opening of the collet, to cause the arms to move to an expanded position, wherein an outer diameter of a free end of the collet is expanded to be greater than an inner diameter of the component;
   moving the collet with the component positioned thereon into alignment with an end of the cable;
   securing the collet to the end of the cable;
   moving the component from the collet to the cable;
   removing the collet from the end of the cable.

2. The method as recited in claim 1, wherein the collet is maintained in the expanded position as the collet is moved into alignment with the cable, wherein an inside diameter of the free end of the collet is greater than an outside diameter of the cable.

3. The method as recited in claim 2, wherein a collet closing mechanism is moved toward the free end of the collet to move the free end of the collet toward the closed position, the collet closing mechanism having an opening with a diameter, wherein the free end of the collet is moved into engagement with the end of the cable to secure the collet to the cable.

4. The method as recited in claim 3, wherein as the free end of the collet is moved into engagement with the end of the cable and the collet is secured to the end of the cable, the collet compresses the free end of the cable, causing the end of the cable to conform to a circular shape of a conductor receiving opening of the collet.

5. The method as recited in claim 4, wherein the component and the cable are positioned proximate each other in a vertical relationship.

6. The method as recited in claim 4, wherein the component and the cable are positioned proximate each other in a horizontal relationship.

7. The method as recited in claim 4, comprising:
engaging additional components with the collet;
moving the collet with the component and the additional components positioned thereon into alignment with an end of the cable;
securing the collet to the end of the cable;
moving the component and the additional components from the collet to the cable;
removing the collet from the end of the cable.

8. The method as recited in claim 6, wherein the collet has resilient arms with slots provided therebetween, the resilient arms are in an unstressed position in the closed position and in a resiliently stressed position in the expanded position.

* * * * *